United States Patent [19]

Itoh et al.

[11] 4,130,456

[45] Dec. 19, 1978

[54] APPARATUS FOR REMOVING UNREACTED MONOMER FROM SLURRY

[75] Inventors: Iko Itoh; Tsukasa Takahashi; Shinkichi Takamuku; Azuma Aramaki; Manabu Serada, all of Niihama, Japan

[73] Assignee: Sumitomo Chemical Company, Limited, Japan

[21] Appl. No.: 790,619

[22] Filed: Apr. 25, 1977

[30] Foreign Application Priority Data

Apr. 26, 1976 [JP] Japan ................................. 51/48305

[51] Int. Cl.$^2$ .............................................. B01D 1/14
[52] U.S. Cl. ................................. 159/165; 159/47 R; 159/DIG. 10; 159/43 R; 528/500; 261/DIG. 76; 34/109
[58] Field of Search .................... 159/16 R, 16 A, 165, 159/DIG. 10, 43 R, 47 R; 528/500; 261/83, 93, DIG. 76; 202/172, 173, 238; 34/109, 187

[56] References Cited

U.S. PATENT DOCUMENTS

| | | | |
|---|---|---|---|
| 2,479,049 | 8/1949 | Poncelet | 34/187 |
| 3,615,668 | 10/1971 | Smith, Jr. | 34/109 |
| 3,730,731 | 5/1973 | Smith, Jr. | 34/109 |

*Primary Examiner*—Norman Yudkoff
*Attorney, Agent, or Firm*—Wenderoth, Lind & Ponack

[57] ABSTRACT

An apparatus and method for the continuous or semi-continuous removal of unreacted monomers from polymer suspension slurrys or latices to produce polymers with the least possible distribution of heat history.

A polymer suspension liquor or latex is supplied to a vessel having open topped compartments positioned on a vertical shaft for rotation. A feed inlet for the polymer suspension liquor is mounted on the shaft to permit introduction of the polymer into each of the open topped compartments. A steam and/or inert gas is introduced at the bottom portion of each compartment to strip a monomer from the polymer.

12 Claims, 2 Drawing Figures

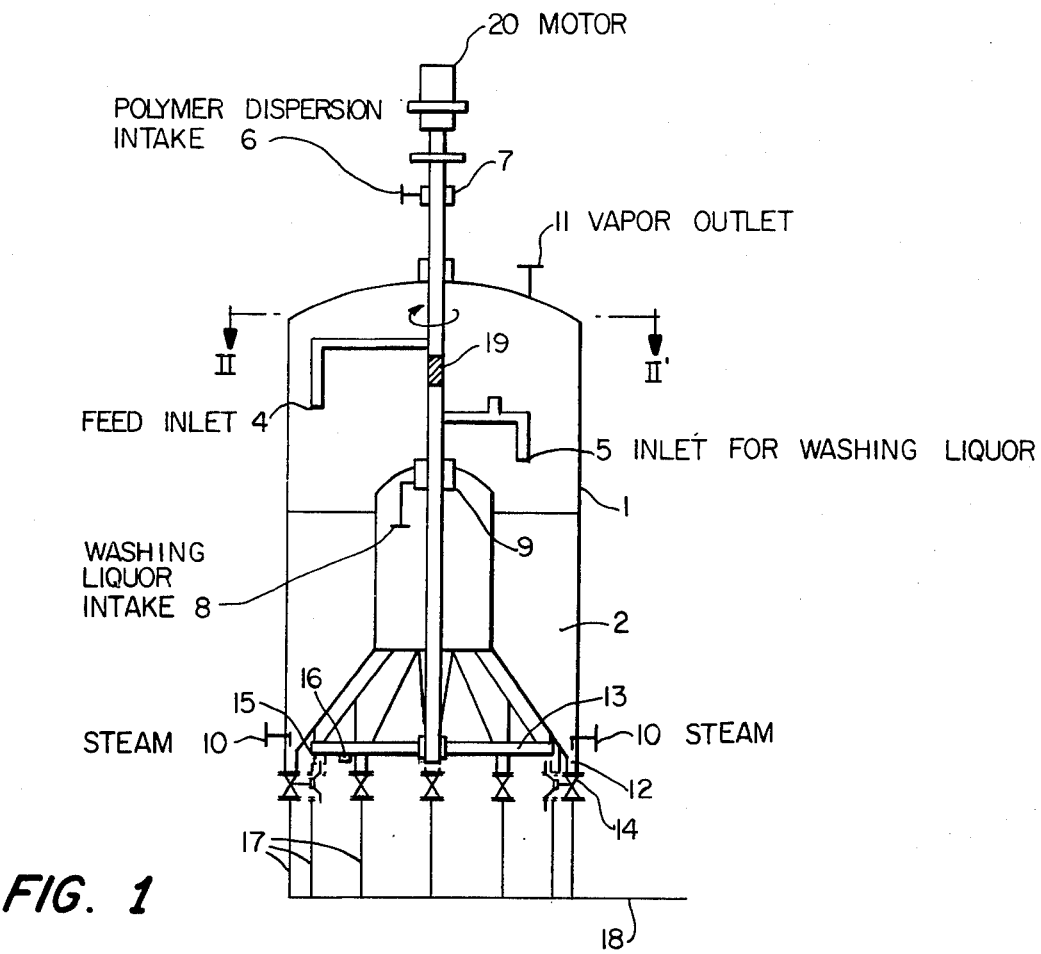
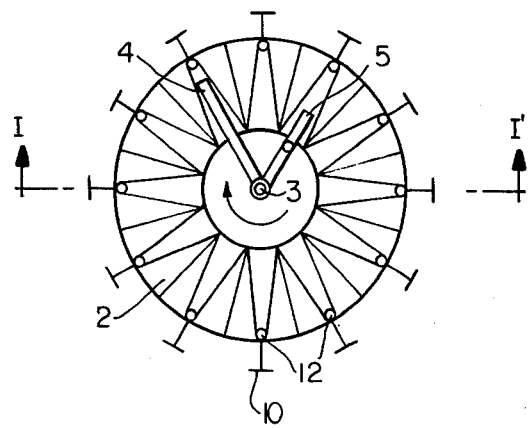

APPARATUS FOR REMOVING UNREACTED MONOMER FROM SLURRY

FIELD OF THE INVENTION

The present invention relates to an apparatus for the removal of unreacted monomers from polymer suspension slurrys or latices (referred to as polymer dispersions hereinafter). More particularly, the present invention relates to an apparatus which enables the continuous or semi-continuous removal of unreacted monomers from polymer dispersion with the least possible distribution of heat history.

DESCRIPTION OF THE PRIOR ART

Hitherto, vessels equipped with a steam inlet and a stirrer were employed for the removal of unreacted monomers from polymer dispersions. In the operation of such vessels, the polymer dispersion is charged into the vessel, heated to a pre-determined temperature by blowing steam alone or together with an inert gas into the polymer dispersion under reduced pressure or atmospheric pressure and is kept at the temperature for a pre-determined period of time.

Said apparatus is structurally very simple, but rapid discharge and cooling after treatment is structurally impossible, as is easily understood. After the removal of monomers, therefore, it takes a long time to discharge the treated polymer dispersion so that there occurs a large difference in retention time; in other words large difference in heat history, between the polymer dispersion at the initial stage of discharge and at the last stage of discharge. As a result, the quality of the polymer is largely influenced by the extent of heat treatment. This tendency becomes particularly remarkable when the rate of removal of unreacted monomers is accelerated by elevating the treatment temperature. Another disadvantage of this apparatus is low productivity due to a batchwise system.

SUMMARY OF THE INVENTION

An object of the present invention is to provide an apparatus which can be operated continuously or semi-continuously without the above-mentioned drawbacks and particularly which minimizes the distribution of heat history of the polymers, thereby enabling production of polymers of uniform quality.

That is to say, an object of the present invention is to provide an apparatus for the removal of unreacted monomers from polymer suspension slurry or latices characterized in that said apparatus comprises a vessel partitioned into a plurality of vertically disposed, open topped compartments in the lower portion thereof, said vessel having a vertical revolving shaft at the center thereof, which shaft comprises a feed inlet for said polymer suspension slurry or latices to be supplied therethrough and a gas outlet at the upper part of said vessel. Said compartments each have an inlet for steam and/or an inert gas and an outlet at the bottom thereof. Said revolving shaft may further comprise an inlet for a washing liquor and an apparatus at the lower end thereof for opening and closing the outlets for said polymer suspension slurry or latices.

BRIEF DESCRIPTION OF THE DRAWINGS

The apparatus of the present invention will be illustrated with reference to one embodiment shown in FIGS. 1 and 2.

FIG. 1 is a vertical sectional view of the apparatus of the present invention along line I-I' of FIG. 2 and;

FIG. 2 is a sectional plan view taken on line II-II' of FIG. 1.

DETAILED DESCRIPTION OF THE INVENTION

In FIGS. 1 and 2, 1 is the body of a vessel and is partitioned at the lower part into at least two, and preferably three to thirty-two, compartments by partition plates 2.

The partition plates 2 may extend from the center of the vessel or from a circle surrounding the center as shown in FIG. 2. Plates 2 are preferably arranged radially. A preferred structure of the lower end of the compartment is such that the discharge of polymer dispersion is facilitated.

By partitioning vessel 1 into many compartments, a continuous or semi-continuous operation becomes possible, and moreover, the amount of polymer dispersion per compartment can be decreased so that the time required for the discharge of polymer dispersion can be shortened and the heat history of the polymer can be made uniform.

A revolving shaft 3 is mounted on the body of vessel 1 in a rotary mechanism. Revolving shaft 3 is equipped with a feed inlet 4 for polymer dispersion and a feed inlet 5 for washing liquors, and the both feed inlets rotate together with shaft 3. It is preferred that the feed inlet 5 for washing liquors has one or more spray-nozzles which are effective for washing. As the washing liquors, water or organic solvents may properly be used depending upon the kind of the medium of polymer dispersion to be treated.

The polymer dispersion and washing liquor are supplied to compartment through feed inlets 4 and 5, respectively, by the mechanism as shown in FIG. 1. Revolving shaft 3 is hollow and is partitioned by plate 19 into a portion for passage of polymer dispersion and washing liquor.

The portion of revolving shaft 3 outside the vessel is connected to pipe 6 through, for example, a rotary joint 7, and the polymer dispersion is supplied to a compartment through intake pipe 6, joint 7, shaft 3 and then feed inlet 4. In the same manner as above, the washing liquor is supplied to a compartment through intake pipe 8, rotary joint 9, shaft 3 and then feed inlet 5. Alternatively, the supply of both liquors may be carried out using a double pipe as a revolving shaft.

Feed inlet 4 is for supplying a polymer dispersion to the compartments. Feed inlet 5 is for supplying a washing liquor to the compartments and the liquor is used for washing off the polymer which remains in the compartments after the treated polymer dispersion is discharged. Consequently, it is desirable that both feed inlets 4 and 5 be mounted on the revolving shaft 3 in such a way that both liquors are supplied to different compartments.

Pipe 10 mounted on every compartment is a feed inlet for steam and/or an inert gas. The position in which the pipe is mounted is optional if it is below the level of the polymer dispersion. But it is desirable to mount the pipe in the lower part of the compartment to make the contact of steam and/or inert gas with polymer dispersion more effective and prevent sedimentation of the polymer dispersion.

Raw steam may be introduced into every compartment through pipe 10, but it is also possible to circulate, for example, exhaust steam containing stripped unreacted monomer withdrawn from gas outlet 11, through pipe 10, to thereby improve steam consumption. The latter circulation system is particularly preferred. Outlet 11 is for exhaust gas containing stripped unreacted monomer and steam. Outlet 12 is an outlet for treated polymer dispersion and waste wash liquor.

Apparatus 13 is mounted on the lower end of the revolving shaft 3 and is used for opening and closing outlet 12. A method for opening and closing outlet 12 by means of apparatus 13 is as follows. Outlet 12 is equipped with a ball valve 14 having a stopper demounted, and a cross-shaped handle is attached to the valve axis. A claw 15 for opening the valve and claw 16 for closing the valve are mounted on apparatus 13 so that each of the claws give one-fourth turn to the handle as shaft 3 rotates, thereby opening and closing the valve, respectively. Alternatively, threads are formed on part of apparatus 13 and the valve head so that both threads engage each other. These methods are preferably employed from the standpoint of economy and maintenance, but the present invention is not limited to these methods. For example, other mechanisms such as manual or electrical mechanisms may be employed.

Feed inlet 4 for the polymer dispersion, feed inlet 5 for washing liquors and claws 15 and 16 on the apparatus are arranged angularly relative to the revolving shaft 3 in the order of claw 15, feed inlet 5, claw 16 and feed inlet 4. Firstly, claw 15 opens liquor outlet 12 to discharge a polymer dispersion from which the monomer has already been removed. Secondly, a washing liquor is supplied through feed inlet 5 to clean the compartment from which the polymer dispersion has been discharged. Thirdly, claw 16 closes outlet 12. Lastly, the polymer dispersion is supplied through feed inlet 4 to the compartment of which outlet 12 has been closed. Further, it is necessary to arrange claw 16 so that liquor outlet 12 is closed after the monomer-stripped polymer dispersion and the washing liquor are discharged. And, it is necessary to arrange the position of feed inlet 4 so that the polymer dispersion can be charged after liquor outlet 12 is closed. Further, what is more desirable is that a spray-nozzle be separately mounted to clean the upper inside surface of the body of vessel 1.

In the figures, the washing waste liquor and the treated polymer dispersion are combined because the formed liquor is relatively small in amount. But both liquors may be separated from each other.

The operation shown in the drawing is such that the supply of polymer dispersion, monomer-stripped treatment, discharge of the treated polymer dispersion and washing are carried out during one turn of revolving shaft 3. But, by increasing the number of compartments, feed inlets 4 for polymer dispersion, feed inlets 5 for washing liquor and claws, a plurality of these cyclic operations may be carried out during one revolution of shaft 3.

Further, it is also possible to control the time for the monomer-stripping treatment by changing the speed of revolution of shaft 3.

The foregoing explanation is for the case wherein a feed inlet 4 for a polymer dispersion and feed inlet 5 for a washing liquor, are mounted on revolving shaft 3. When washing is not necessary, however, it is, of course, not necessary to mount feed inlet 5 for washing liquor. In this case, it is possible to use revolving shaft 4 for polymer dispersion and revolving shaft 3 may be used for feed inlet 4 for polymer dispersion.

Next, the operation will be illustrated with refeence to the equipment of the present invention having the above-mentioned structure.

Vessel 1 was a long-legged vessel having 12 compartments as shown in FIG. 2. Claw 15 for opening a valve, feed inlet 5 for a washing liquor, claw 16 for closing the valve, and feed inlet 4 for a polymer dispersion were angularly mounted on a revolving shaft 3 so that the angles between the two adjacent members were 15 degrees, 17.5 degrees and 30 degrees, respectively.

The apparatus having such arrangement is merely one example and the present invention is not limited thereto.

Steam is introduced into vessel 1 through all inlets 10 while the gas in vessel 1 is discharged through gas outlet 11.

A polymer dispersion is supplied continuously through pipe 6, rotary joint 7, revolving shaft 3 and feed inlet 4, while a washing liquor is supplied continuously through pipe 8, rotary joint 9, revolving shaft 3 and feed inlet 5. During these continuous operations, revolving shaft 3 is rotated at an optional speed by means of motor 20. The polymer dispersion supplied may be previously heated or not.

The polymer dispersion supplied to a compartment is heated to a pre-determined temperature by steam or steam and an inert gas introduced through steam inlet 10, is kept at this temperature for a pre-determined period of time, for example, while feed inlet 5 rotates a 10-compartment distance in this example.

The temperature to which a polymer dispersion is heated and the period during which the liquor is held at the temperature, depend upon the kind of objective polymer and content of the unreacted monomer. With, for example, vinylchloride polymers or their copolymers, it is common that the polymer dispersion be kept at 70° to 120° C., and preferably 90° to 100° C. for less than about 2 hours, and preferably 1 to 20 minutes. By the treatment under such conditions, the monomer content in the polymer can be reduced to less than one-tenth. In the eleventh compartment from the one to which the polymer dispersion liquor is being supplied, the liquor outlet 12 is opened by claw 15 mounted on apparatus 13, and the liquor in said compartment is discharged through pipe 17 and stored in a storage tank (not shown) through pipe 18. The liquor is forcibly cooled if necessary.

In the twelfth compartment (adjacent compartment) from the one to which the polymer dispersion is being supplied, the treated polymer dispersion has already been discharged and the polymer adhered to the wall is washed off with a washing liquor and the liquor outlet 12 is closed by operating the valve by means of claw 16 mounted on apparatus 13.

In the second compartment from the one wherein washing is being carried out, the polymer dispersion is being supplied.

Consequently, feed inlet 5 for a washing liquor, apparatus 13 and feed inlet 4 for a polymer dispersion pass a compartment, with the continuous revolution of revolving shaft 3. In this way, the above-mentioned operations are carried out successively at each compartment. As a result, supply of the polymer dispersion and discharge of the treated polymer dispersion can be carried out continuously and a continuous treatment in one vessel becomes possible. It is, of course, possible to operate semi-continuously depending upon the number of compartments. The foregoing explanation is principally to provide the monomer-stripping treatment under heating. Needless to say, the method of the present invention is effectively applied to the treatment which is carried out without heating or while blowing in an inert gas.

The following is an example of a presently preferred embodiment.

EXAMPLE

The apparatus of the present invention shown in FIG. 1 (diameter 1.8 m, volume/compartment 0.2 m$^3$, number of compartments 12) was operated as follows. The polymer slurry containing 11,000 ppm based on dry polymer of the unreacted monomer and 25% by weight of the vinylchloride polymer having an average polymerization degree of 750, was previously heated to 80° C. This pre-heated slurry was continuously supplied at a rate of 6 m$^3$/hr through pipe 6, revolving shaft 3 and feed inlet 4 for a polymer dispersion. At the same time, steam at 100° C. was continuously supplied to every compartment at a rate of 0.07 T/hr through pipe 10, and washing water and also continuously supplied at a rate of 0.6 m$^3$/hr through pipe 8, revolving shaft 3 and feed inlet 5 for washing liquor.

The shaft 3 revolved at 1/12 r.p.m.

The separated unreacted monomer and steam were purged through gas outlet 11 by means of a recovering blower and the unreacted monomer was recovered, by separating the steam with a condenser.

After a compartment was opened by means of claw 15 mounted on the lower end of revolving shaft 3, the polymer slurry was discharged through pipe 17, stored in a storage tank through pipe 18 and cooled. The waste wash water was also discharged through pipe 17 and mixed with the treated vinylchloride polymer slurry.

It was found that the vinylchloride polymer thus treated contained 320 ppm of the unreacted monomer.

The operation was then carried out under the same conditions as above, except that air was introduced into every compartment at a rate of 40 m$^3$/hr together with steam. As a result, it was found that the vinylchloride polymer thus treated contained 120 ppm of the unreacted monomer.

The treated vinylchloride polymer slurry could be discharged in a very short period of time and moreover in a continuous operation.

The following points are apparent from the abovedescribed example. Since the apparatus of the present invention employs a vessel which is partitioned into many compartments and two kinds of liquor can be supplied through the revolving shaft, it becomes possible to carry out a continuous or semicontinuous treatment-washing in one vessel. Further, since the time required for the discharge of treated polymer slurry can be shortened, the heat history of polymer can be made uniform.

Thus, the apparatus of the present invention is very desirable for the obtention of a high quality of treated polymer and with high efficiency.

What is claimed is:

1. An apparatus for the removal of unreacted monomers from polymer suspension liquors or latices which comprises:
   (a) a vessel partitioned into a plurality of vertically disposed, open topped compartments in the lower portion thereof;
   (b) said vessel having a vertical revolving shaft at center thereof, said shaft comprising a feed inlet for said polymer suspension liquors or latices to be supplied therethrough, said feed inlet rotatably mounted above said open topped compartments so as to permit introduction of said polymer suspension liquors or latices into each of said open topped compartments;
   (c) a gas outlet at upper part of said vessel; and
   (d) said compartments each having a feed inlet for steam and/or an inert gas and an outlet at the bottom thereof.

2. The apparatus for the removal of unreacted monomers from polymer suspension liquors or latices according to claim 1 wherein in that said revolving shaft further comprises a feed inlet for a washing liquor to be supplied therethrough, said washing liquor inlet rotatably mounted so as to permit introduction of washing liquor into each of said open topped compartments.

3. The apparatus for the removal of unreacted monomers from polymer suspension liquors or latices according to claim 1 characterized in that said revolving shaft has an apparatus at lower end thereof for opening and closing the outlets for said suspension liquors or latices.

4. The apparatus of claim 1 having at least 2 compartments.

5. The apparatus of claim 1 having from 3 to 32 compartments.

6. The apparatus of claim 1 wherein said compartments are radially disposed about the bottom of said vessel.

7. The apparatus of claim 1 wherein said shaft is a substantially hollow tube partitioned into an upper and lower portion, each of said portions having an intake and a discharge port, the discharge port of one portion being adapted for use as the polymer suspension liquor or latex inlet and the other being adapted for use as the wash water outlet.

8. The apparatus of claim 1 wherein said shaft comprises two pipes, one of which is adapted for use as the polymer suspension liquor or latex inlet and the other being adapted for use as the wash water inlet.

9. A method for the removal of unreacted monomer from a polymer suspension liquor or latex containing unreacted monomer which comprises:
   supplying a polymer suspension liquor or latex to an open topped vessel having a plurality of vertically disposed, open topped compartments in the lower portion thereof; said vessel having a vertical revolving shaft at the center thereof, said shaft comprising a feed inlet for said polymer suspension liquor or latex to be supplied therethrough, said feed inlet being rotatably mounted above said open topped compartment so as to permit the introduction of said polymer suspension liquor or latex into each of the said open topped compartments,
   removing unreacted monomer from each of said compartments via a monomer removal means so as to effect the removal of said monomers with the least possible heat history.

10. The method of claim 9 wherein said monomer removal means comprises an inlet for steam and/or an inert gas at the bottom portion of each of said compartments and wherein the monomer is stripped by said steam or inert gas.

11. A method according to claim 9 wherein an inlet for washing liquor is supplied above each of said compartments, said washing liquor inlet being rotatably mounted above said compartments so as to permit the introduction of washing liquor into each of said compartments.

12. A method according to claim 10 wherein an inlet for washing liquor is supplied above each of said compartments, said washing liquor inlet being rotatably mounted above said compartments so as to permit the introduction of washing liquor into each of said compartments.

* * * * *